Figure 1:
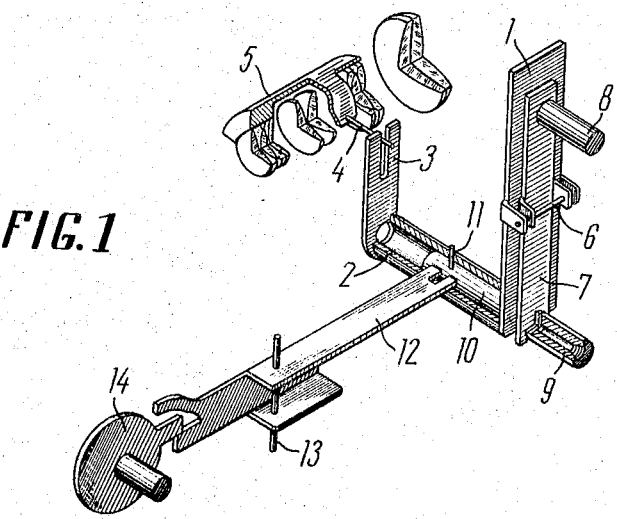

June 27, 1967  S. G. BABUSHKIN  3,328,114
CONTROL DEVICE FOR LENS FOCAL LENGTH VARIATION
AND CAMERA ACTUATING
Filed June 5, 1964

3,328,114
CONTROL DEVICE FOR LENS FOCAL LENGTH
VARIATION AND CAMERA ACTUATING
Svjatoslav Grigorjevich Babushkin, Leningrad, U.S.S.R.,
assignor to Leningradskoje Objedinenije Optikomekha-
nicheskikh predprijaty, Leningrad, U.S.S.R.
Filed June 5, 1964, Ser. No. 372,921
7 Claims. (Cl. 352—140)

The present invention relates to a device designed for controlling the focal length variation of a camera lens and for actuating the camera employing a lens with variable focal length.

The known cameras, employing a lens with variable focal length are provided with a first device used to control the variation of the focal length of the lens, said first device being located in one place usually on the lens and a second device used to control the actuation of the camera located in another place. Therefore, the operator has to work with both hands simultaneously to change the focal length of the lens when shooting with such a camera. This makes it difficult to reliably hand hold the camera.

An object of the present invention is to eliminate the drawback described above.

The invention contemplates the provision of a device both for controlling camera actuation and the lens focal length variation, which permit performance of both said operations with one hand or even with one finger, thus providing for reliable holding of the camera with the other hand.

According to the invention, the device contains a unit used to control the focal length variation of the lens, said unit comprising a movable part with a component for manual control coupled with movable optical components of the lens, and a unit for control of the camera actuation, the latter said unit comprising a movable part with a component for manual control connected with the film transport mechanism, both units being united so that the movable parts with the components for manual control of both said units are located one on the other, the mutual location of the components for manual control permitting camera actuation and varying of the lens focal length with one hand.

It is convenient, when the movable part with the component for manual control included in the unit for control of the lens focal length variation is formed as a lever with a case attached thereto, said lever being coupled with the optical movable components of the lens through a hollow bushing, one end of which is secured to said lever, and the other end of which a component used to move the movable components of the lens; in this case the movable part with the component for manual control included in the unit for control of camera actuation is also formed as a lever, swinging on an axle, said axle being located on the lever for control of the focal length variation and bearing at least one button for control of camera actuation, said unit being connected with the film transport mechanism through a rod, coupled with the lever swinging on the axle, said rod being located inside said hollow bushing and through a two-arm lever, connected with said rod and interacting with the film transport mechanism.

Figure 2:
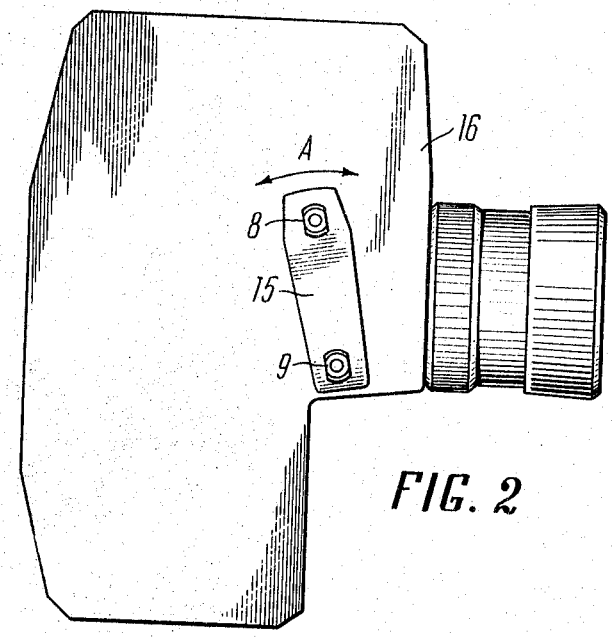

The invention is now described in greater detail with reference to the accompanying drawings in which:

FIG. 1 is a perspective view diagrammatically illustrating one of the embodiments of the device according to the invention; and FIG. 2 shows the mounting of the device on a camera.

In the drawing a lever 1 is rigidly fixed via bushing 2 to plate 3, which has a slot for receiving a pin 4 of a mounting 5, said mounting constituting a support for the movable optical components of the lens. Upon turning lever 1, and consequently of plate 3 around bushing 2, mounting 5 moves along the optical axis of the lens, thus changing the focal length thereof. Mounted on lever 1 via axle 6 is a further lever 7, supporting buttons 8 and 9 respectively for uninterrupted and frame shooting. Lever 7 is coupled at its lower end with a rod 10 housed in bushing 2. With one of buttons 8, 9 being pressed, lever 7 turns around axle 6 and moves rod 10 along the axle. Rod 10 has a stud 11 for turning two-arm lever 12 around axle 13 to release stop device 14 of the camera mechanism (not shown in the drawing). After the device is assembled, a case 15 is fastened on lever 1 (FIG. 2), said case having openings for buttons 8, 9 and covering the whole device, said case also serving to actuate lever 1.

Camera 16 is held with the right hand at its lower part, the forefinger being placed on the upper end of case 15. For continuous shooting button 8 is pressed; if it is accompanied by turning of case 15 along arrow A, the focal length of the lens is varied.

Other designs of the device are possible, for instance, when the component for manual control of the focal length variation is located on the lens, a flexible coupling may be provided between the button located on said component and the starting lever.

What is claimed is:

1. A device for controlling the focal length variation of a camera lens and for actuating a camera employing a lens with variable focal length, said device comprising a first unit for control of the focal length variation of the lens, comprising a movable part with a component for manual control, said first unit being adapted for being coupled with movable optical components of the lens; said device further comprising a second unit for control of the camera actuation, said second unit comprising a movable part with a component for manual control, said second unit being adapted for being coupled with the film transport mechanism; and means connecting said manual control components in superimposed relation to permit camera actuation and focal length variation of the lens with one hand.

2. A device for controlling the focal length variation of a camera lens and for actuating a camera employing a lens with variable focal length, said device comprising a first unit for control of the focal length variation of the lens, said first unit consisting of a hollow bushing turning around an axle, a component adapted for moving the movable components of the lens, said component being rigidly secured to one end of said hollow bushing, a lever attached to the other end of said hollow bushing, said lever to be used for manual control; said device further containing a second unit for control of the camera actuation, said second unit including a lever rotatably mounted on the first said lever which controls the lens focal length variation, said lever of the second unit bearing at least one button for control of the camera actuation, a rod coupled with said lever of the second unit, said rod being disposed inside the hollow bushing and adapted for interacting with the film transport mechanism.

3. For a camera having a lens of variable focal length and a film transport mechanism, a device comprising: first means for controlling the focal length variation of the lens, second means for controlling the actuation of the film transport mechanism, and third means coupled to both said first and second means for operating the same, said third means including first and second actuator members respectively coupled to said first and second means, and means connecting said actuator members together as a common unit of sufficiently small size to enable their individual operation with one hand of an operator.

4. A device as claimed in claim 3 wherein one of said actuator members is movable along a particular path to operate its respective means, the other actuator member being connected to said one actuator member by said third means for movement along a particular path to operate its respective means, each actuator member as it moves along its own path having no influence on the means associated with the other actuator member.

5. A device as claimed in claim 4 wherein one of said actuator members moves along a pivotal path about a given axis while the other actuator member moves along a pivotal path about an axis perpendicular to the first said axis.

6. A device as claimed in claim 3 wherein one of said actuator members is mounted for pivotal movement and the other actuator member is connected to the first said member.

7. A device as claimed in claim 3 wherein one of said actuator members is mounted for pivotal movement about an axis and the other actuator member is connected to said one member for pivotal movement about an axis perpendicular to the first said axis.

References Cited

UNITED STATES PATENTS 2,995,061  8/1961  Briskin et al.
3,200,411  8/1965  Townsley _____ 352—140

NORTON ANSHER, *Primary Examiner.*

H. H. FLANDERS, R. A. WINTERCORN,
*Assistant Examiners.*